April 13, 1943.   C. H. SMITH   2,316,722
HAY BALER
Filed Dec. 15, 1941   3 Sheets-Sheet 2
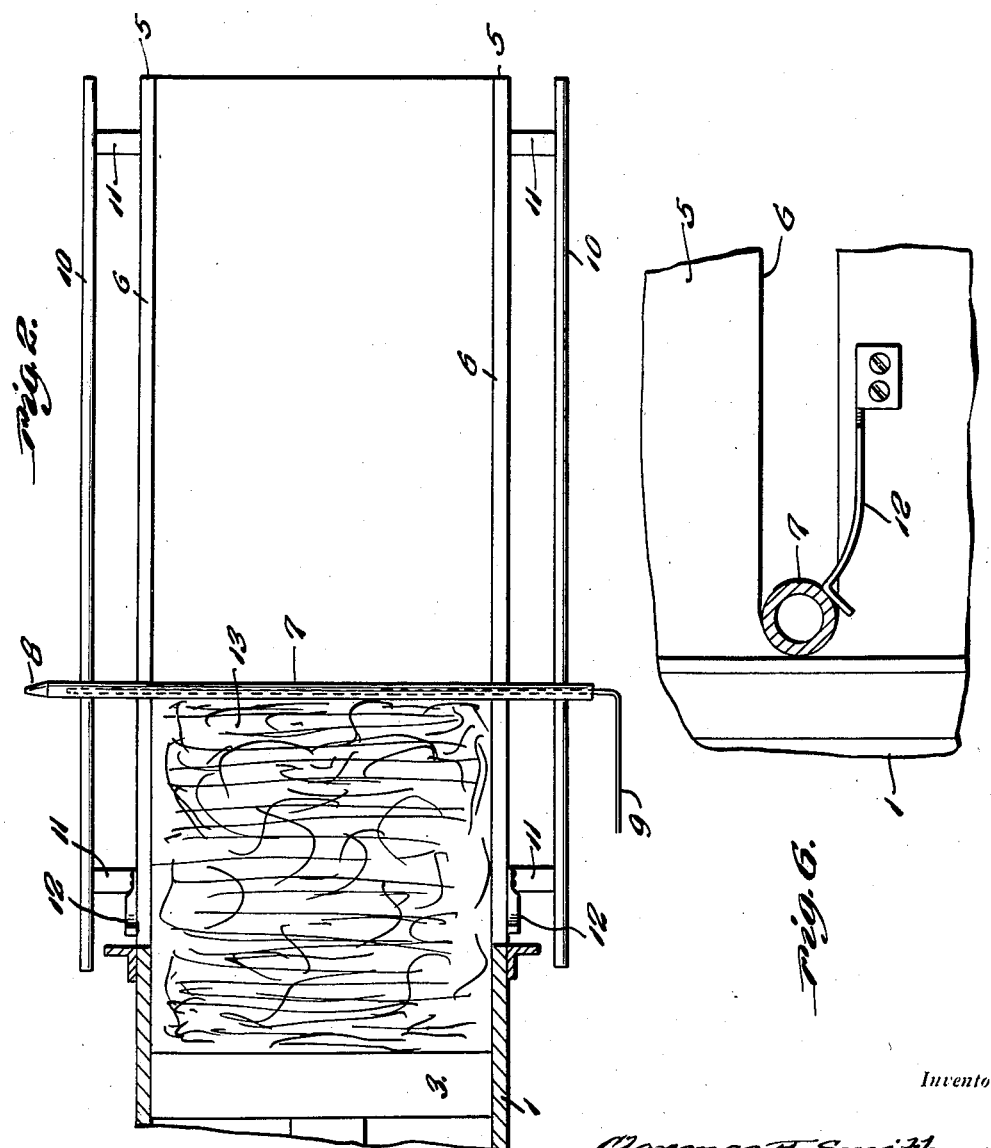
Inventor
Clarence H. Smith
By Clarence A. O'Brien
Attorney April 13, 1943. C. H. SMITH 2,316,722
HAY BALER
Filed Dec. 15, 1941 3 Sheets-Sheet 3
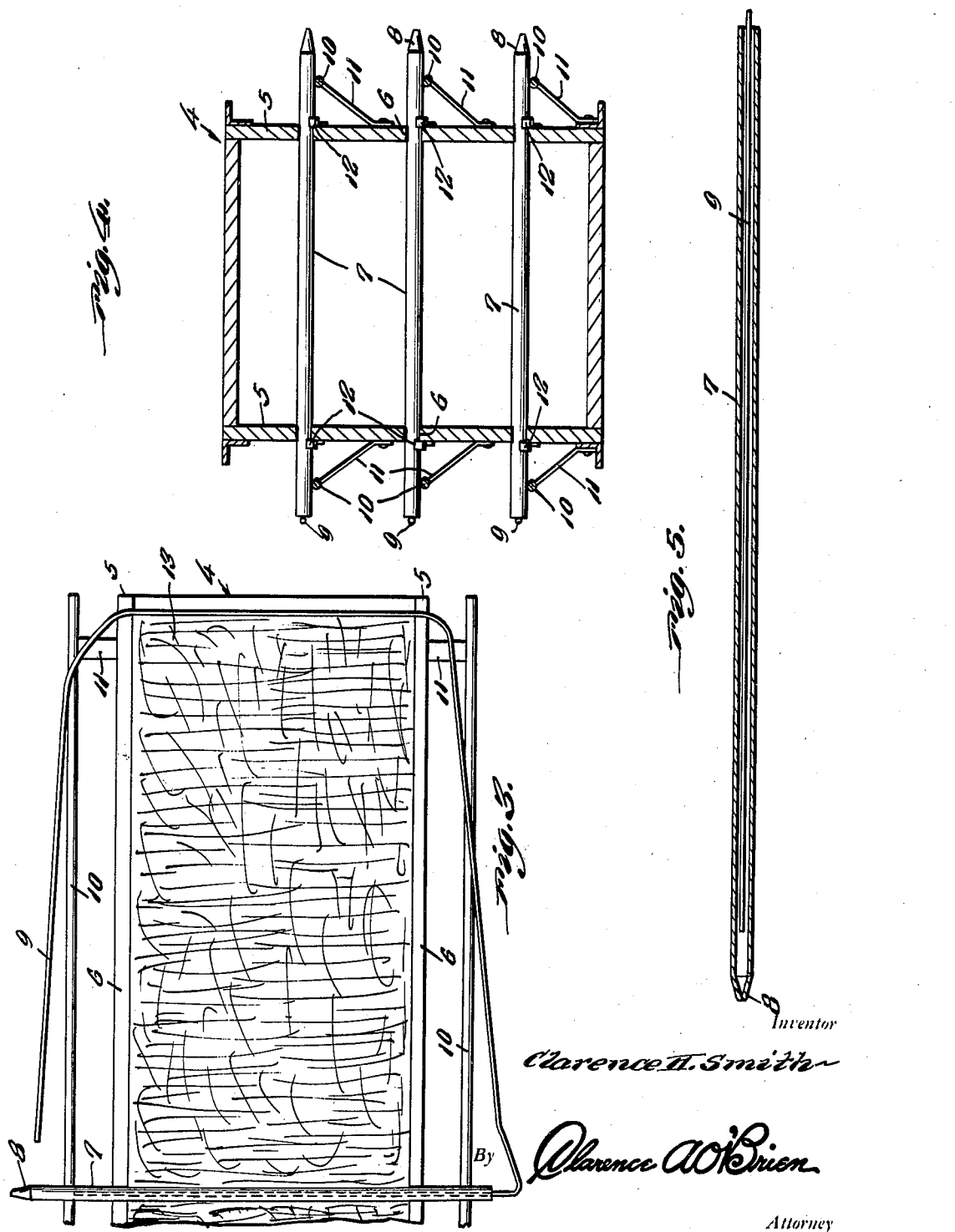

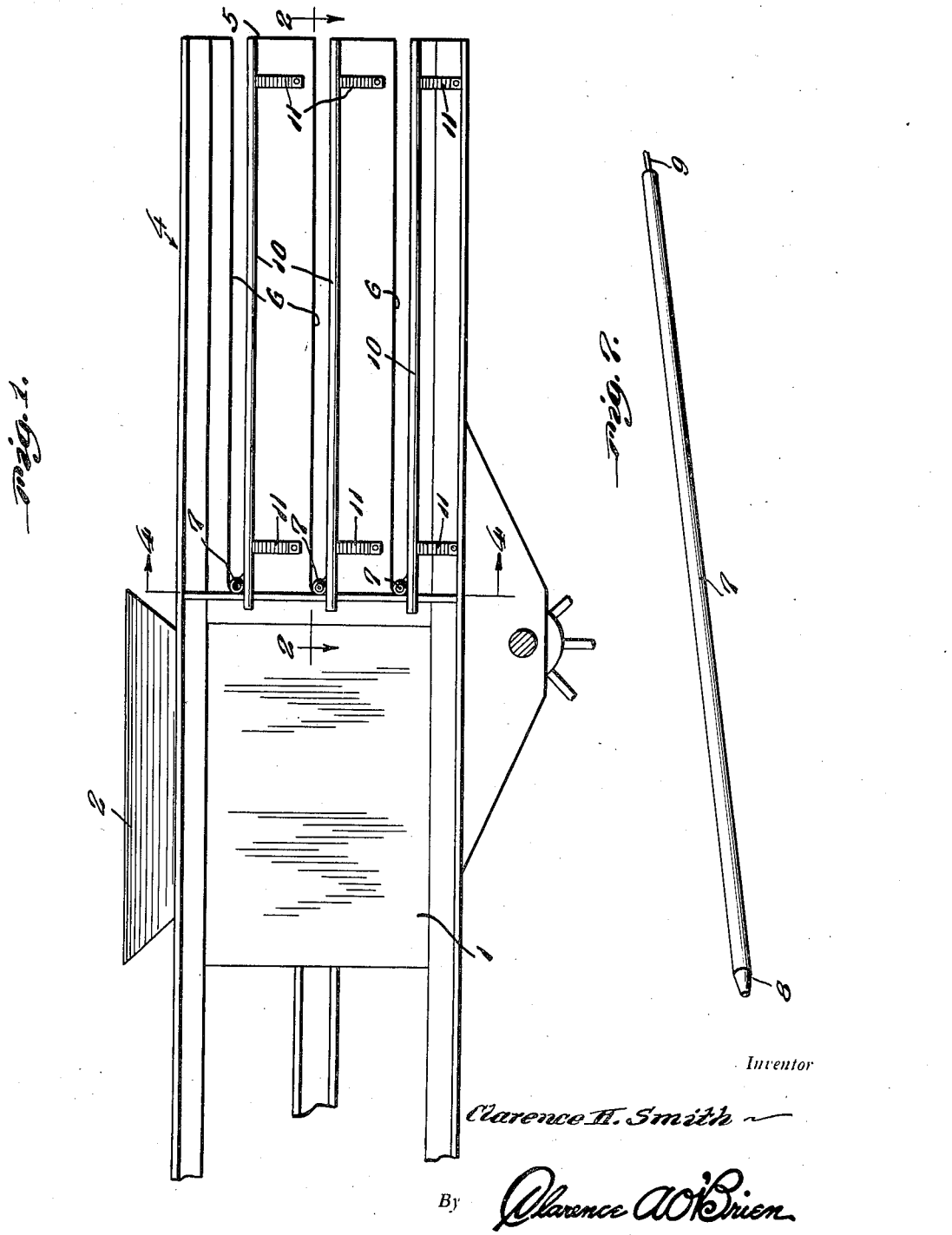

Patented Apr. 13, 1943

2,316,722

UNITED STATES PATENT OFFICE 2,316,722

HAY BALER

Clarence H. Smith, Claysville, Pa.

Application December 15, 1941, Serial No. 423,091

1 Claim. (Cl. 100—20)

The present invention relates to new and useful improvements in hay balers and has for its primary object to provide, in a manner as hereinafter set forth, a machine of this character comprising novel means for placing the wires around the bales as they leave the chamber.

Other objects of the invention are to provide a hay baler of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of the chamber of a hay baler embodying the present invention.

Figure 2 is a view in horizontal section, taken substantially on the line 2—2 of Figure 1 but showing a bale partially formed.

Figure 3 is a view in horizontal section substantially similar to Figure 2 but showing the bale completed and ready to be tied.

Figure 4 is a cross-sectional view, taken substantially on the line 4—4 of Figure 1.

Figure 5 is a view in longitudinal section through one of the tubular needles with a wire engaged therein.

Figure 6 is a fragmentary view in side elevation, showing the means for releasably securing the tubular needles, one of said needles being shown in cross-section.

Figure 7 is a perspective view of one of the needles.

Referring now to the drawings in detail, it will be seen that the embodiment of the invention which has been illustrated comprises a chamber 1 for the reception of the hay, said chamber being provided with the usual intake opening 2. A conventional plunger 3 is operable in the chamber 1.

The chamber 1 further includes an extension 4 comprising side walls 5. Extending longitudinally into the side walls 5 from the forward ends thereof is a plurality of slots 6. The slots 6 are for the reception of tubular metallic needles 7 which are adapted to be inserted transversely through the extension 4 adjacent the chamber 1. The needles 7 are provided with closed, pointed forward ends 8. The other ends of the needles 7 are open for the insertion of one end portion of the baling wires 9. This is shown to advantage in Figure 5 of the drawings.

The needles 7 are adapted to travel on rails 10 which are mounted on the outer faces of the side walls 5 through the medium of supporting brackets 11. The rails 10 are in the form of metallic rods. As illustrated to advantage in Figure 6 of the drawings, resilient latches 12 are also provided on the side walls 5 for releasably securing the needles 7 in the rear end portions of the slots 6.

It is thought that the operation of the baler will be readily apparent from a consideration of the foregoing. Briefly, the needles 7, with one end portion of the wires 9 therein, are positioned transversely in the rear or inner end portions of the slots 6 where they are releasably secured by the latches 12, said needles resting on the rails 10. As the bale, as at 13, emerges from the chamber 1 the needles 7 are pushed thereby past the resilient latches 12 on the rails 10, said needles travelling in the slots 6. These needles are then withdrawn, leaving one end portion of the wires 9 extending transversely across the extension 4 at the front end of the bale being formed. These, or additional needles, with the other end portions of the wires 9 therein, are then inserted in the rear end portions of the slots 6 and engaged behind the resilient latches 12. This is done while the plunger 3 is retracted. The last placed needles are then pulled on through the extension 4, leaving the other end portions of the wire extending through the hay at the rear end of the bale. The end portions of the wires are then tied together in the usual manner and the operation is complete.

It is believed that the many advantages of a hay baler comprising the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A hay baler comprising a chamber including an extension, said extension comprising opposed side walls having slots extending longitudinally thereinto from one end thereof, brackets mounted on the side walls, rails mounted on said brackets and paralleling the slots, tubular needles, for the reception of baling wires, engageable transversely in the slots and operable on the rails, said needles being open at their rear ends and terminating in closed, pointed forward ends, and resilient latches on the side walls for releasably securing the needles in the closed end portions of the slots.

CLARENCE H. SMITH.